(12) United States Patent
Clymer et al.

(10) Patent No.: US 6,672,169 B2
(45) Date of Patent: Jan. 6, 2004

(54) PERFORMANCE MEASURING SYSTEM AND METHOD FOR ANALYZING PERFORMANCE CHARACTERISTICS OF ROTATING SHAFTS

(75) Inventors: Mark Clymer, Mystic, CT (US); Edward April, Mystic, CT (US)

(73) Assignee: Clymer Technologies, LLC, Mystic, CT (US)

( * ) Notice: Subject to any disclaimer, the term of this patent is extended or adjusted under 35 U.S.C. 154(b) by 0 days.

(21) Appl. No.: 10/152,082

(22) Filed: May 20, 2002

(65) Prior Publication Data

US 2003/0010127 A1 Jan. 16, 2003

Related U.S. Application Data

(60) Provisional application No. 60/291,875, filed on May 18, 2001.

(51) Int. Cl.$^7$ ................................................ G01N 29/00
(52) U.S. Cl. ........................... 73/660; 73/643; 73/650; 73/862.321
(58) Field of Search ..................... 73/660, 643, 650, 73/659, 658, 862.08, 862.23, 862.59, 862.624, 862.625, 862.26, 862.321

(56) References Cited

U.S. PATENT DOCUMENTS

| | | | | |
|---|---|---|---|---|
| 4,507,958 A | * | 4/1985 | Russell et al. ............. | 73/152.54 |
| 4,872,342 A | * | 10/1989 | Hanson et al. ............. | 73/514.29 |
| 5,099,690 A | * | 3/1992 | Califano ...................... | 73/510 |
| 6,314,342 B1 | * | 11/2001 | Kramer et al. .............. | 701/1 |
| 6,322,324 B1 | * | 11/2001 | Kennedy et al. ............ | 416/1 |
| 6,401,535 B1 | * | 6/2002 | Foote ........................... | 73/514.29 |
| 6,418,390 B1 | * | 7/2002 | Wahl ............................ | 702/113 |
| 6,422,080 B1 | * | 7/2002 | Lalouette .................... | 73/579 |
| 6,453,669 B2 | * | 9/2002 | Kennedy et al. ............ | 60/527 |
| 6,484,578 B2 | * | 11/2002 | Woodruff et al. .......... | 73/514.29 |

* cited by examiner

Primary Examiner—Herzon Williams
Assistant Examiner—Jacques Saint-Surin
(74) Attorney, Agent, or Firm—McCormick, Paulding & Huber LLP

(57) ABSTRACT

A performance measuring system for a rotating shaft comprises a first annular support assembly to be coupled adjacent to a first end of a rotating shaft inwardly of associated shaft bearings. A second annular support assembly is to be coupled adjacent to a second end of a rotating shaft inwardly of associated shaft bearings. A third annular support assembly is to be coupled to the rotating shaft between the first and second support assemblies. A laser source is mounted on the first annular support assembly. A laser detector is mounted on the second annular support assembly. First and second magnetic sensors for detecting the Earth's magnetic field are mounted respectively on the first and second annular support assemblies. An accelerometer is mounted on the third annular support assembly for generating a fourth detection signal.

17 Claims, 3 Drawing Sheets

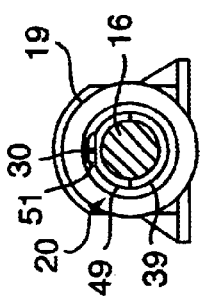
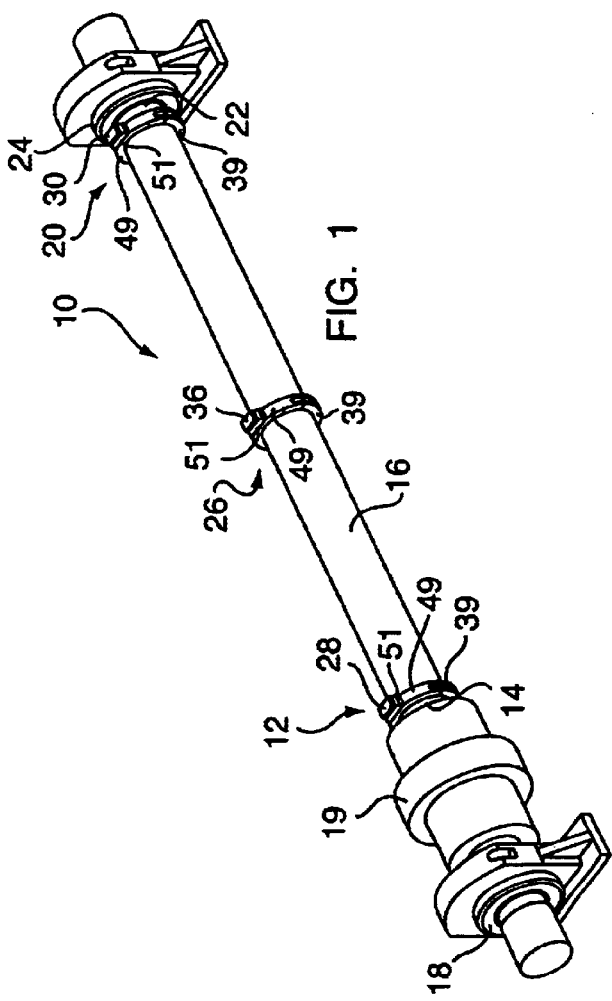
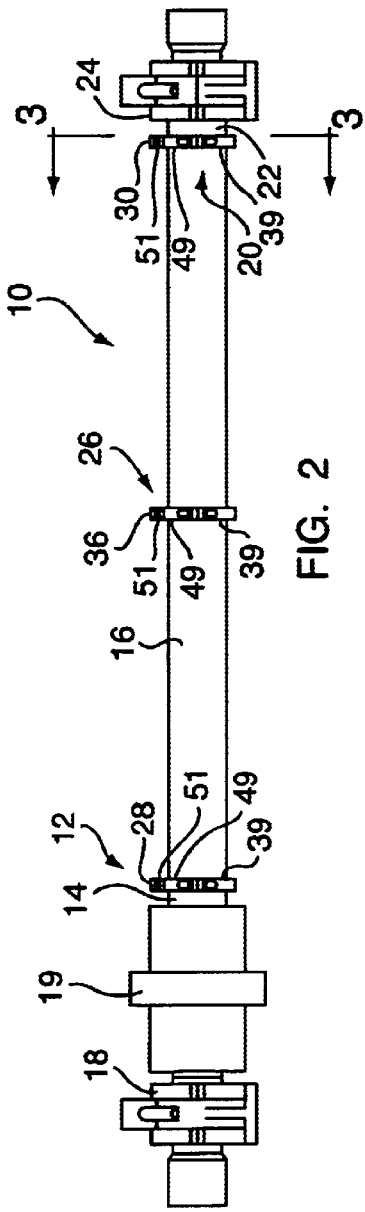

US 6,672,169 B2

PERFORMANCE MEASURING SYSTEM AND METHOD FOR ANALYZING PERFORMANCE CHARACTERISTICS OF ROTATING SHAFTS

REFERENCE TO RELATED APPLICATION

This application claims the benefit of U.S. Provisional Application No. 60/291,875, filed May 18, 2001, the disclosure of which is herein incorporated by reference.

FIELD OF THE INVENTION

This invention relates generally to performance indicators for rotating shafts, and more particularly to a system and method for monitoring the dynamics of rotating shafts including torque, shaft imbalance and torsional vibration.

BACKGROUND OF THE INVENTION

In the marine market, existing torquemeters for measuring performance characteristics of rotating shafts, such as a ship's propulsion shaft, are quite expensive, technically complicated, require significant modification to the shaft, and have poor reliability. Because of these problems, there has been resistance by fleet owners and operators to using or relying on torquemeters. Torque measurements directly off the shaft, however, if done accurately and reliably, can provide much valuable and useful information. Shaft torque variations can provide clues to a variety of equipment conditions such as propeller mismatch or damage, hull fouling, engine cylinder misfiring, bearing problems and overtorque. In twin engine installations torque monitoring on both shafts can allow for more precise engine RPM/torque balancing and for the economics associated with more efficient operation. Over time, comparison of torque/horsepower vs. fuel consumption can allow the fleet owner to save fuel and propulsion equipment by running the vessels at optimum RPM/torque for any given set of conditions or sea states. Sensor data stored by the computer can be analyzed to search for possible patterns of machinery wear and fatigue. Alarm conditions can be programmed into a computer and displayed to the operator when torque limits, RPM limits and sea conditions exceed prescribed limits.

In response to the foregoing, it is an object of the present invention to overcome the drawbacks and disadvantages of prior art rotating shaft monitors.

SUMMARY OF THE INVENTION

In a first aspect of the present invention, a performance measuring system for a rotating shaft comprises a first annular support assembly to be coupled adjacent to a first end of a rotating shaft inwardly of associated shaft bearings. A second annular support assembly is to be coupled adjacent to a second end of a rotating shaft inwardly of associated shaft bearings. A third annular support assembly is to be coupled to the rotating shaft and to be interposed between the first and second support assemblies. A laser source is mounted on the first annular support assembly. A laser detector is mounted on the second annular support assembly for generating a first detection signal. A first magnetic sensor for detecting the Earth's magnetic field is mounted on the first annular support assembly for generating a second detection signal. A second magnetic sensor for detecting the Earth's magnetic field is mounted on the second annular support assembly for generating a third detection signal. An accelerometer is mounted on the third annular support assembly for generating a fourth detection signal.

In a second aspect of the present invention, a performance measuring system for a rotating shaft comprises a first annular support assembly to be coupled adjacent to a first end of a rotating shaft inwardly of associated shaft bearings. A second annular support assembly is to be coupled adjacent to a second end of a rotating shaft inwardly of associated shaft bearings. A third annular support assembly is to be coupled to the rotating shaft and to be interposed between the first and second support assemblies. A laser diode is mounted on the first annular support assembly. A photodiode or a phototransistor is mounted on the second annular support assembly for generating a first detection signal. A first magnetic spin sensor for detecting the Earth's magnetic field is mounted on the first annular support assembly for generating a second detection signal. A second magnetic spin sensor for detecting the Earth's magnetic field is mounted on the second annular support assembly for generating a third detection signal. An accelerometer is mounted on the third annular support assembly for generating a fourth detection signal.

In a third aspect of the present invention, a performance measuring system for a rotating shaft comprises a first split-ring clamp assembly to be coupled adjacent to a first end of a rotating shaft inwardly of associated shaft bearings. A second split-ring clamp assembly is to be coupled adjacent to a second end of a rotating shaft inwardly of associated shaft bearings. A third split-ring clamp assembly is to be coupled to the rotating shaft and to be interposed between the first and second split-ring clamp assemblies. A laser diode is mounted on the first split-ring clamp assembly. A photodiode or a phototransistor is mounted on the second split-ring clamp assembly for generating a first detection signal. A first magnetic spin sensor for detecting the Earth's magnetic field is mounted on the first split-ring clamp assembly for generating a second detection signal. A second magnetic spin sensor for detecting the Earth's magnetic field is mounted on the second split-ring clamp assembly for generating a third detection signal. An accelerometer is mounted on the third split-ring clamp assembly for generating a fourth detection signal.

In a fourth aspect of the present invention, a method of performing measurements on a rotating shaft comprising the steps of positioning a laser source on a rotating shaft adjacent to one end of the shaft, positioning a laser detector on the rotating shaft adjacent to the other end of the shaft, positioning a first magnetic spin sensor on the rotating shaft adjacent to one end of the shaft for detecting the Earth's magnetic field, positioning a second magnetic spin sensor on the rotating shaft adjacent to the other end of the shaft for detecting the Earth's magnetic field, and positioning an accelerometer on the rotating shaft so as to be interposed between the laser and magnetic spin components. A first detection signal is generated from the laser detector. A second detection signal is generated from the first magnetic spin sensor. A third detection signal is generated from the second magnetic spin sensor, and a fourth detection signal is generated from the accelerometer. The detection signals include information on the level of torque being applied to the rotating shaft. Preferably the information is transmitted to a remote processor for determining whether the torque applied to the rotating shaft is above a predetermined threshold level. If the applied torque is above the predetermined threshold level, preferably an alarm is activated. More preferably, the alarm is audible.

A first advantage of the present invention is that the detectors of the measuring system are mounted directly on the rotating shaft to be monitored, as opposed to the surrounding shaft support system, so as to eliminate the effects of a ship's structural flexing and vibration on the measurement system.

A second advantage of the present invention is that simplicity of the system, the small size and weight, and the elimination of the necessity to modify the monitored shaft makes the system feasible and practical for smaller workboats.

Other objects and advantages of the present invention will become apparent in view of the following detailed description and accompanying drawings.

BRIEF DESCRIPTION OF THE DRAWINGS

FIG. 1 is a perspective view of a performance measuring system for a rotating shaft in accordance with the present invention.

FIG. 2 is a side elevational view of the performance measuring system of FIG. 1

FIG. 3 is a cross-sectional view of the performance measuring system taken along the lines 3—3 of FIG. 2.

DETAILED DESCRIPTION OF THE PREFERRED EMBODIMENT

Figure 4:
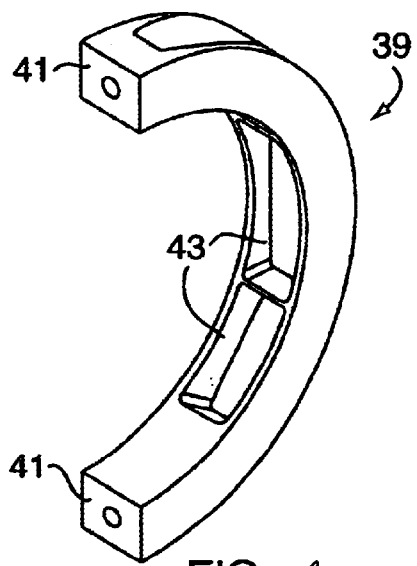
FIG. 4 is a perspective view of first half of a split-ring clamp of an annular support assembly in accordance with the present invention.

With reference to FIGS. 1–10, a performance measuring system for a rotating shaft embodying the present invention is indicated generally by the reference number 10. The performance measuring system 10 includes a first annular support assembly 12 to be coupled adjacent to a first end 14 of a rotating shaft 16 inwardly of associated shaft bearings 18 and a shaft coupling 19. A second annular support assembly 20 is to be coupled adjacent to a second end 22 of the rotating shaft 16 inwardly of associated bearings 24. A third annular support assembly 26 is to be coupled to the rotating shaft 16 and to be interposed between the first and second annular support assemblies 12, 20. As will be explained more fully with respect to FIGS. 4–6, the annular support assemblies preferably include split-ring clamp assemblies in order that the support assemblies can be easily mounted on the rotating shaft 16 without disassembling the shaft. As shown in FIGS. 1 and 2, the third annular support assembly 26 is preferably positioned about midway between the shaft bearings 18 at the first end 14 of the shaft 16 and the shaft bearings 24 at the second end 22 of the shaft, or about midway between the first and second annular support assemblies 12 and 20, but may be positioned anywhere between the shaft bearings 18 and 22 without departing from the scope of the present invention.

Figure 7:
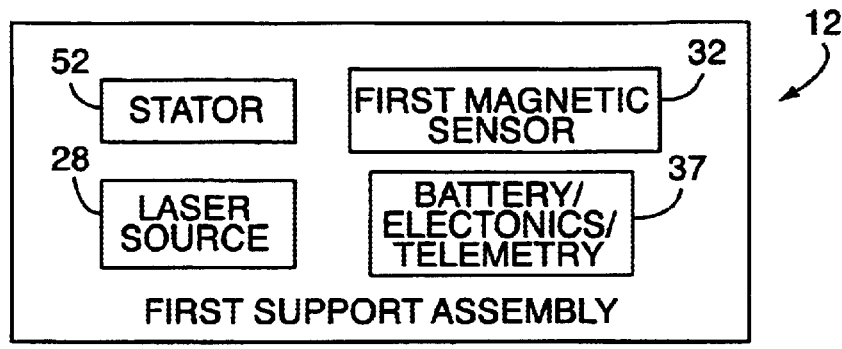
FIG. 7 is a schematic block diagram illustrating the components mounted on the first support assembly of the performance measuring system of FIG. 1.
Figure 8:
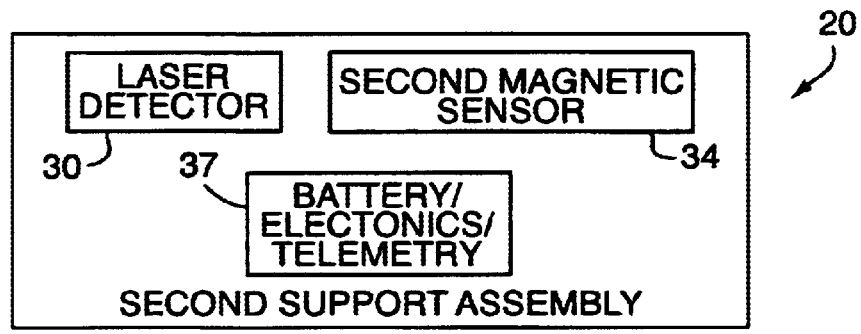
FIG. 8 is a schematic block diagram illustrating the components mounted on the second support assembly of the performance measuring system of FIG. 1.
Figure 9:
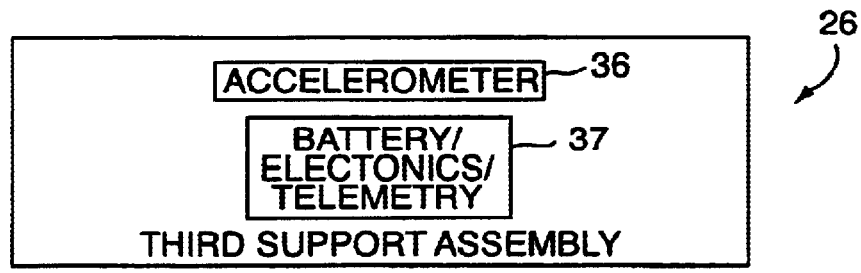
FIG. 9 is a schematic block diagram illustrating the components mounted on the third support assembly of the performance measuring system of FIG. 1.

Referring to FIGS. 7–9, a laser source 28, such as a laser diode, is mounted on the first annular support assembly 12, and a laser detector 30, such as a photodiode or a phototransistor, is mounted on the second annular support assembly 20 for generating a first detection signal in response to light received from the laser source. A first magnetic sensor 32, such as a magnetic spin sensor, for detecting the Earth's magnetic field is mounted on the first annular support assembly 12 for generating a second detection signal. A second magnetic sensor 34 for detecting the Earth's magnetic field is mounted on the second annular support assembly 20 for generating a third detection signal. An accelerometer 36 is mounted on the third annular support assembly 26 and generates a fourth detection signal. Conventional battery, electronics and FM telemetry 37 for powering the laser, magnetic sensors and accelerometer components are preferably mounted on the first, second and third support assemblies 12, 20 and 26.

Figure 5:
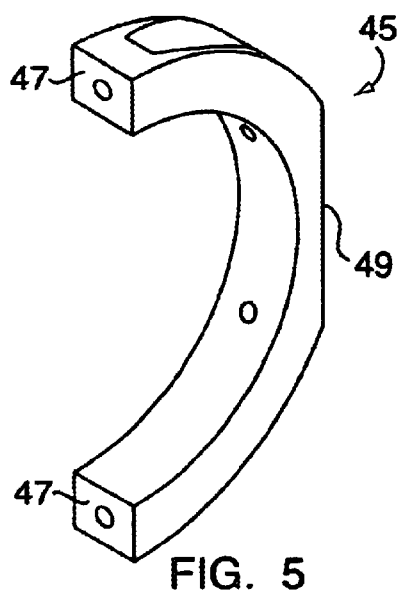
FIG. 5 is a perspective view of a second half of a split-ring clamp of an annular support assembly.
Figure 6:
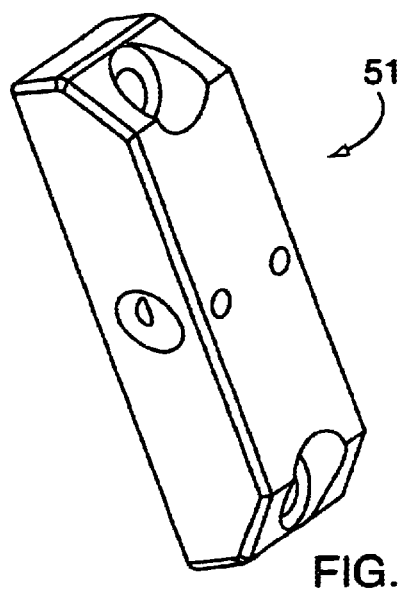
FIG. 6 is a perspective view of a laser send/receive bracket that is mounted on the split-ring clamp of the performance measuring system.

An embodiment of a split-ring clamp for supporting the laser, magnetic sensor and associated power and telemetry components is illustrated in FIGS. 4–6. As shown in FIG. 4, a first half of a split-ring clamp 39 having ends 41, 41 is generally semi-annular in shape and defines a plurality of recesses 43, 43 for accommodating battery, telemetry and associated electronics therein. FIG. 5 shows a second half of a split-ring clamp 45 having ends 47, 47. The second half clamp 45 defines a partially flat outer surface 49 serving as a mounting surface for a bracket 51, shown in FIG. 6, that holds the laser components. For example, the bracket 51 mounted on the flat outer surface 49 of the second half clamp 45 forming part of the first annular support assembly 12 holds the laser source 28. Similarly, the bracket 51 mounted on the second half clamp 45 forming part of the second annular support assembly 20 holds the laser detector 30. The clamps are assembled by abutting the ends 41, 41 of the first clamp 39 against the ends 47, 47 of the second clamp 45 so that the clamp can be secured on an installed shaft without the need to disassemble the shaft.

Figure 10:
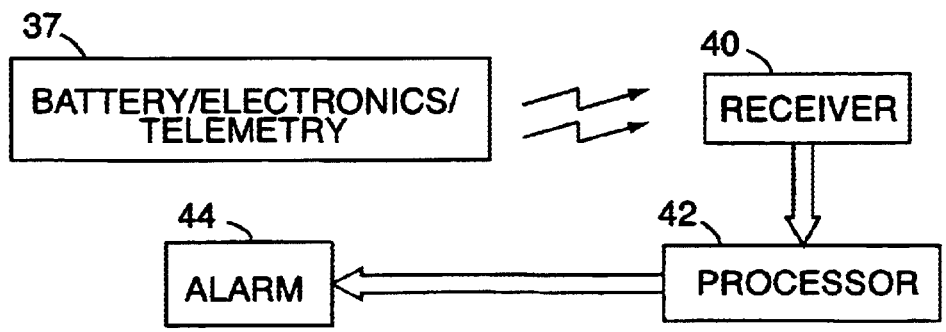
FIG. 10 is a schematic block diagram of a performance measuring system including additional remote equipment for processing the information generated by the detectors of the performance measuring system.

Turning now to FIG. 10, the performance measuring system 10 may also include additional remote equipment for processing the information generated by the detectors of the measuring system 10 shown in FIGS. 1–3. As mentioned previously, for example, the performance measuring system 10 may also include telemetry components such as a conventional FM transmitter to be mounted on the support assemblies of the rotating shaft 16 for generating a transmission signal carrying information based on the detection signals. A conventional FM receiver 40 is disposed remotely from the rotating shaft 16 (i.e., not mounted on the shaft). Preferably, the FM receiver 40 is located in proximity to the shaft 16. A processor or computer 42 communicates with the FM receiver 40 for processing the information carried on the transmission signal. Preferably, a conventional alarm system 44 communicates with the processor 42 to activate an alarm—such as an audible alarm—when the processor determines that information carried by the transmission signal indicates that the torque of the rotating shaft 16 is above a predetermined threshold level. Although the alarm system 44 is shown and described as separate from the processor 42, it should be understood that the processor may include the alarm system without departing from the scope of the present invention.

In operation, for the measurement of torque of the rotating shaft 16, two sensing techniques are used. First, an optical technique uses the laser diode 28 and the photodiode detector 30. Second, a magnetic technique uses the first and second magnetic spin sensors 32, 34. The detectors with associated conventional electronics, batteries and FM radio telemetry 37 are mounted on the first, second and third split-ring clamps 12, 20 and 26. The split-ring clamps 12, 20 and 26 are preferably low-profile and placed on the rotating shaft 16 as far apart from one another as possible so that the detectors measure greater shaft twist, which in turn results in an increased accuracy of measurement. On a ship, for example, the split-ring clamps 12, 20 and 26 are placed on a clear shaft run between the bearings 18, 24, as shown in FIGS. 1 and 2.

The laser system employs a conventional laser diode 28 mounted on the first split-ring clamp 12 with a photodiode detector 30 mounted on the second split-ring clamp 20. At zero torque the photodiode 30 records the maximum measured value (setting 0). As the rotating shaft 16 begins to transmit torque, the output value—a voltage output—will decrease as torque increases. The laser diode 28 and the photodiode 30 become increasingly misaligned as the torque increases. The performance measuring system 10 of the present invention provides continuous torque output much like a conventional strain gauge system without the difficulty of installation and short operational life that is typical of a strain gauge system. When the shaft 16 returns to zero torque, the laser diode 28 and the photodiode 30 will again be aligned (resetting 0). Continuous torque measurement permits the detection and monitoring of minute variations in shaft torque during a cycle. An example is torsional vibration transmitted by engine cylinder misfiring or sea-state variations. The continuous torque reading provides the input to the over torque alarm system 44 to inform the operator that safe conditions are being exceeded.

The magnetic sensing aspect of the present invention measures shaft spin rate, RPM, and torque through the use of the Earth's magnetic field as the measuring medium. The first and second magnetic spin sensors 32, 34, sensitive to the Earth's magnetic field and switching relative to the major magnetic vector of the Earth's magnetic field, are mounted respectively on the first and second split-ring clamps 12, 20. This arrangement of the magnetic sensors 32, 34 allows for the measurement of shaft twist by monitoring the phase shift of the switch points of the magnetic sensors as the shaft experiences torsion. The magnetic spin sensors 32, 34 of the performance measuring system 10 in accordance with the present invention do not require the use of magnets on the shaft 16 and are mounted solely on the shaft. Although not providing continuous torque measurement as does the laser system, the first and second magnetic sensors 32, 34 provide two pulses per revolution of the shaft 16, as well as indication of shaft RPM. The first and second magnetic sensors 32, 34 preferably activate shutdown of the electronics 37 when the shaft 16 is not rotating in order to conserve battery life.

For measuring off-axis energies, the accelerometer 36 mounted on the third split-ring clamp 26 is preferably positioned on the shaft 16 about midway between the first and second annular support assemblies 12 and 20, or about midway between the bearings 18 at the first end 14 of the shaft 16 and the bearings 24 at the second end 22 of the shaft. The accelerometer 36 detects whether the shaft 16 is bent or out of balance.

All data is transmitted from the shaft 16 via FM telemetry 37 to the FM receiver 40 located preferably in proximity to the shaft. The equipment to accomplish this is readily available off-the-shelf and does not require FCC licensing.

The data is subsequently relayed from the radio receiver 40 to the processor 42 such as a dedicated single-board computer driving a touch screen display (not shown). The touch screen allows the operator to display the information that is of interest. The audible alarm 44 is activated by sensing torque greater than a predetermined threshold level.

All of the electronics on the shaft is powered by a rechargeable battery system. On one clamp ring a stator 52 is mounted and the nearby bearing supports a magnetic rotor 54, creating a simple generator for holding a charge on the battery. The magnetic spin sensors 32 and 34 put the system to sleep when the shaft 16 is not rotating and awaken the system automatically when the shaft begins to rotate.

As will be recognized by those of ordinary skill in the pertinent art, numerous modifications and substitutions may be made to the above-described embodiment of the present invention without departing from the scope of the invention as set forth in the appended claims. Accordingly, the preceding portion of this specification is to be taken in an illustrative, as opposed to a limiting sense.

What is claimed is:

1. A performance measuring system for a rotating shaft, the performance measuring system comprising:
    a first annular support assembly to be coupled adjacent to a first end of a rotating shaft inwardly of associated shaft bearings;
    a second annular support assembly to be coupled adjacent to a second end of the rotating shaft inwardly of associated shaft bearings;
    a third annular support assembly to be coupled to the rotating shaft and to be interposed between the first and second support assemblies;
    a laser source mounted on the first annular support assembly;
    a laser detector mounted on the second annular support assembly for generating a first detection signal based on light received from the laser source and indicative of the degree of torque exerted on the rotating shaft;
    a first magnetic sensor for detecting the Earth's magnetic field, the first magnetic sensor being mounted on the first annular support assembly for generating a second detection signal based on detection of the Earth's magnetic field and indicative of shaft spin rate and torque;
    a second magnetic sensor for detecting the Earth's magnetic field, the second magnetic sensor being mounted on the second annular support assembly for generating a third detection signal based on detection of the Earth's magnetic field and indicative of shaft spin rate and torque;
    an accelerometer mounted on the third annular support assembly for generating a fourth detection signal based on rotational acceleration of the shaft and indicative of whether the rotating shaft is bent or out of balance; and
    a transmitter to be mounted on the rotating shaft for generating a transmission signal carrying information based on the detection signals for processing in order to determine the performance of the rotating shaft.

2. A performance measuring system as defined in claim 1, further comprising a rechargeable battery system for powering the performance measuring system, the battery system including a rechargeable battery to be mounted on the rotating shaft, a stator mounted on one of the annular support assemblies, and a magnetic rotor to be mounted on the associated shaft bearings, the stator and rotor cooperating as a generator to charge the battery.

3. A performance measuring system as defined in claim 1, further comprising:
   a receiver to be disposed remotely from the rotating shaft for receiving the transmission signal.

4. A performance measuring system as defined in claim 3, wherein the transmitter is an FM transmitter, and the receiver is an FM receiver.

5. A performance measuring system as defined in claim 4, further including a processor communicating with the receiver for processing the information carried on the transmission signal.

6. A performance measuring system as defined in claim 5, further including an alarm system communicating with the processor for activating an alarm when information carried by the transmission signal indicates that torque of the rotating shaft is above a predetermined threshold level.

7. A performance measuring system as defined in claim 6, wherein the alarm system is an audible system.

8. A performance measuring system as defined in claim 1, wherein the first and second magnetic sensors are magnetic spin sensors.

9. A performance measuring system as defined in claim 1, wherein the laser source includes a laser diode, and the laser detector includes a photodiode.

10. A performance measuring system as defined in claim 1, wherein the annular support assemblies include split-ring clamps.

11. A performance measuring system for a rotating shaft, the performance measuring system comprising:
   a first annular support assembly to be coupled adjacent to a first end of a rotating shaft inwardly of associated shaft bearings;
   a second annular support assembly to be coupled adjacent to a second end of the rotating shaft inwardly of associated shaft bearings;
   a third annular support assembly to be coupled to the rotating shaft and to be interposed between the first and second support assemblies;
   a laser diode mounted on the first annular support assembly;
   a photodiode mounted on the second annular support assembly for generating a first detection signal based on light received from the laser diode and indicative of the degree of torque exerted on the rotating shaft;
   a first magnetic spin sensor for detecting the Earth's magnetic field, the first magnetic spin sensor being mounted on the first annular support assembly for generating a second detection signal based on detection of the Earth's magnetic field and indicative of shaft spin rate and torque;
   a second magnetic spin sensor for detecting the Earth's magnetic field, the second magnetic spin sensor being mounted on the second annular support assembly for generating a third detection signal based on detection of the Earth's magnetic field and indicative of shaft spin rate and torque;
   an accelerometer mounted on the third annular support assembly for generating a fourth detection signal based on rotational acceleration of the shaft and indicative of whether the rotating shaft is bent or out of balance; and
   a transmitter to be mounted on the rotating shaft for generating a transmission signal carrying information based on the detection signals for processing in order to determine the performance of the rotating shaft.

12. A performance measuring system for a rotating shaft, the performance measuring system comprising:
   a first split-ring clamp assembly to be coupled adjacent to a first end of a rotating shaft inwardly of associated shaft bearings;
   a second split-ring clamp assembly to be coupled adjacent to a second end of the rotating shaft inwardly of associated shaft bearings;
   a third split-ring clamp assembly to be coupled to the rotating shaft and to be interposed between the first and second split-ring clamp assemblies;
   a laser diode mounted on the first split-ring clamp assembly;
   a photodiode mounted on the second split-ring clamp assembly for generating a first detection signal based on light received from the laser diode and indicative of the degree of torque exerted on the rotating shaft;
   a first magnetic spin sensor for detecting the Earth's magnetic field, the first magnetic spin sensor being mounted on the first split-ring clamp assembly for generating a second detection signal based on detection of the Earth's magnetic field and indicative of shaft spin rate and torque;
   a second magnetic spin sensor for detecting the Earth's magnetic field, the second magnetic spin sensor being mounted on the second split-ring clamp assembly for generating a third detection signal based on detection of the Earth's magnetic field and indicative of shaft spin rate and torque;
   an accelerometer mounted on the third split-ring clamp assembly for generating a fourth detection signal based on rotational acceleration of the shaft and indicative of whether the rotating shaft is bent or out of balance;and
   a transmitter to be mounted on the rotating shaft for generating a transmission signal carrying information based on the detection signals for processing in order to determine the performance of the rotating shaft.

13. A method of measuring parameters of a rotating shaft, comprising the steps of:
   providing a laser source on a rotating shaft adjacent to one end of the shaft;
   providing a laser detector on the rotating shaft adjacent to the other end of the shaft;
   providing a first magnetic spin sensor on the rotating shaft adjacent to one end of the shaft for detecting the Earth's magnetic field;
   providing a second magnetic spin sensor on the rotating shaft adjacent to the other end of the shaft for detecting the Earth's magnetic field;
   providing an accelerometer on the rotating shaft so as to be interposed between the laser source and the laser detector;
   generating a first detection signal from the laser detector;
   generating a second detection signal from the first magnetic spin sensor;
   generating a third detection signal from the second magnetic spin sensor;
   generating a fourth detection signal from the accelerometer;
   generating a transmission signal carrying information based on the detection signals for processing in order to determine the performance of the rotating shaft.

14. A method as defined in claim 13, further comprising the step of processing the information carried on the transmission signal to determine if the torque applied to the rotating shaft is above a predetermined threshold.

15. A method as defined in claim 14, further including the step of activating an alarm if the torque applied to the rotating shaft is above the predetermined threshold.

16. A method as defined in claim 14, further including the step of activating an audible alarm if the torque applied to the rotating shaft is above the predetermined threshold.

17. A method as defined in claim 13, wherein the step of providing an accelerometer includes positioning the accelerometer about midway between the laser source and the laser detector.

* * * * *